United States Patent
Hua

(10) Patent No.: US 8,724,089 B2
(45) Date of Patent: May 13, 2014

(54) COMPRESSED SCAN SYSTEMS

(76) Inventor: Wensheng Hua, Fremont, CA (US)

( * ) Notice: Subject to any disclaimer, the term of this patent is extended or adjusted under 35 U.S.C. 154(b) by 785 days.

(21) Appl. No.: 12/762,059

(22) Filed: Apr. 16, 2010

(65) Prior Publication Data

US 2010/0269231 A1     Oct. 21, 2010

Related U.S. Application Data

(60) Provisional application No. 61/169,923, filed on Apr. 16, 2009.

(51) Int. Cl.
*G01C 3/08*     (2006.01)
(52) U.S. Cl.
USPC ......... 356/3.09; 356/3.01; 356/3.1; 356/4.01; 356/4.1
(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 2003/0137674 A1* | 7/2003 | Norita et al. | 356/601 |
| 2007/0165208 A1* | 7/2007 | Cowburn et al. | 356/71 |

* cited by examiner

*Primary Examiner* — Luke Ratcliffe
(74) *Attorney, Agent, or Firm* — Edward C. Kwok; Hogan Lovells US LLP

(57) ABSTRACT

A method for building a fast scan system is provided in which a scanner moves the scan sensors faster than scanners of the prior art, even though the total distance that the scan sensors move longer. The scan system includes (a) a scan sensor that measures the scan target by moving around it, and (b) a data processing system that calculates a parameter of the scan target from the collected data. The scan sensor, which has a limited sensing bandwidth, is moved along multiple paths along the target at a scan speed that is faster than the scan speed determined by the scan sensor bandwidth, so as to obtain a clear signal directly from the scan sensor output. The target is then recovered from the scan output using a compressed sampling data recovery data processing method.

36 Claims, 17 Drawing Sheets

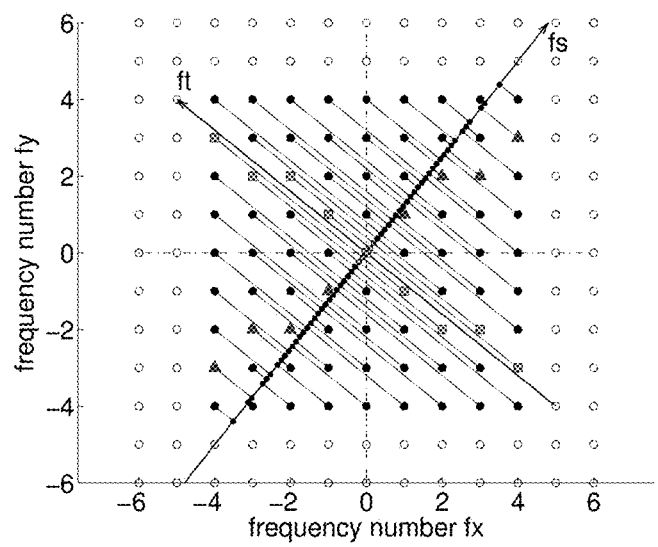
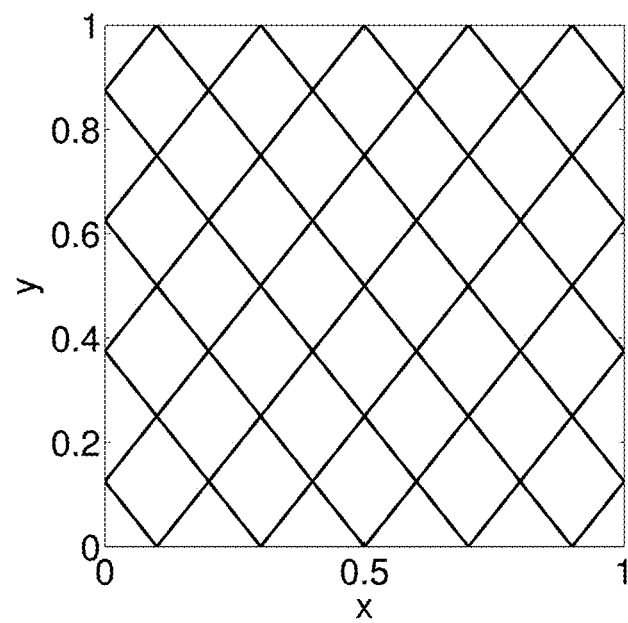
Figure 5.a

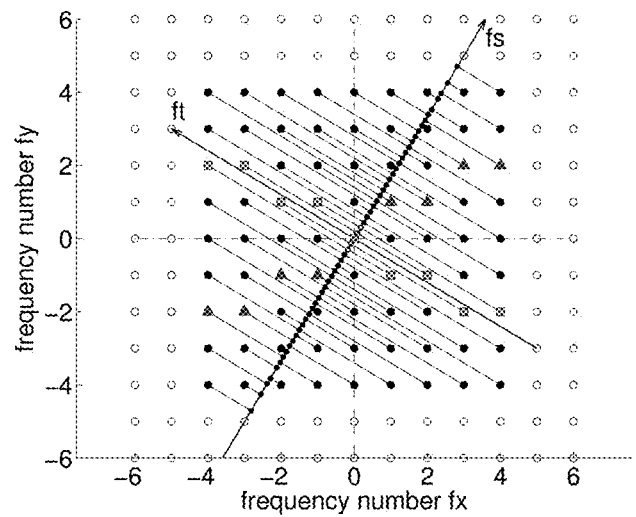
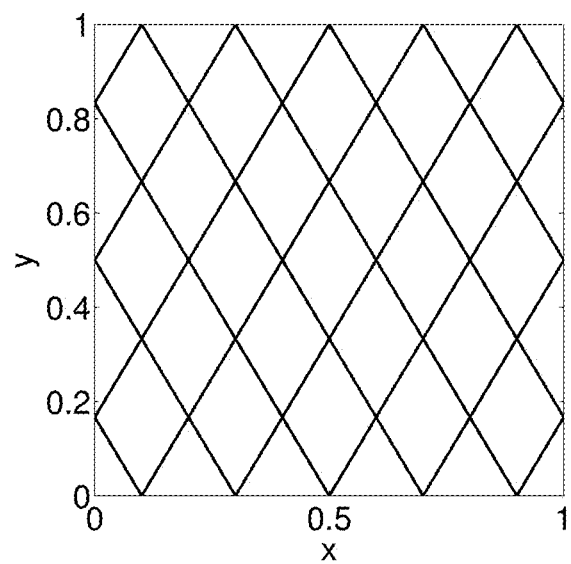
Figure 5.b

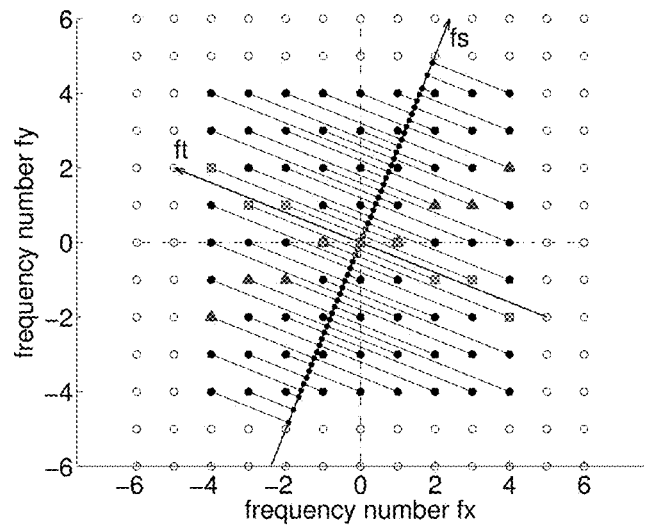
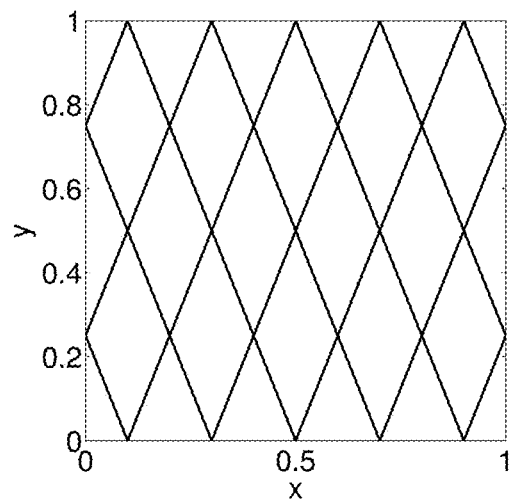
Figure 5.c

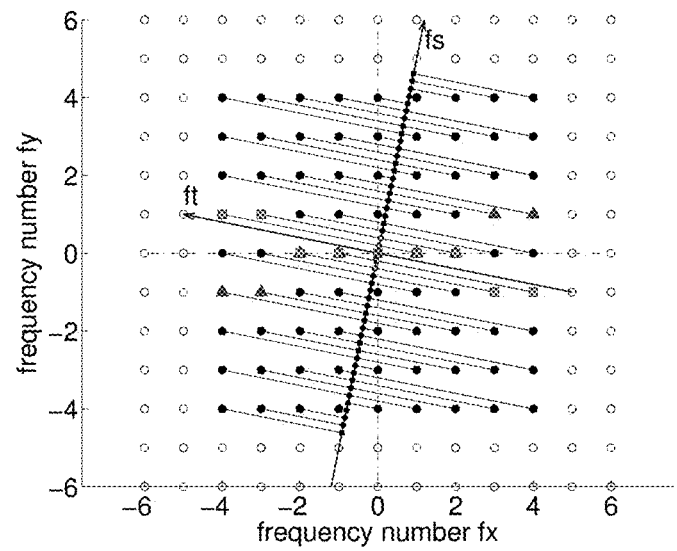
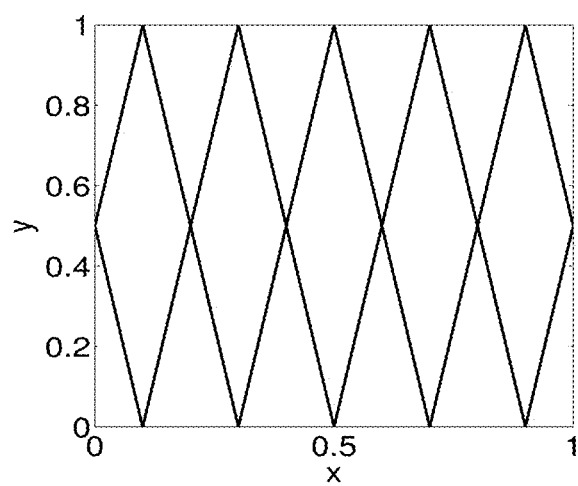
Figure 5.d

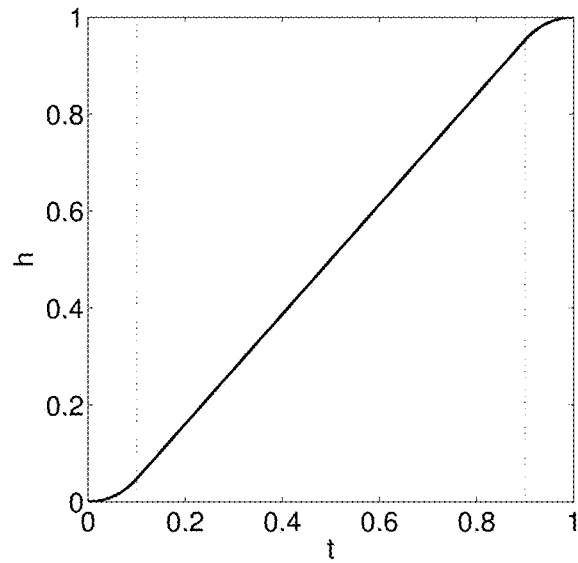
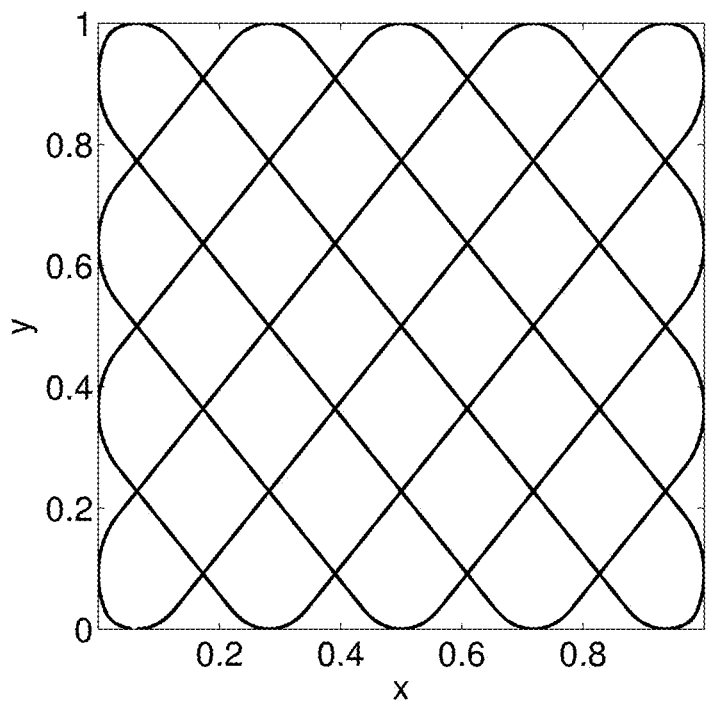
Figure 10

COMPRESSED SCAN SYSTEMS

CROSS REFERENCE TO RELATED APPLICATIONS

The present application is related to, and claims priority of, provisional patent application Ser. No. 61/169,923, entitled "Compressed Sampling for Scan Systems with Limited Sensing Bandwidth", M-17596-V1 US, filed on Apr. 16, 2009. The provisional patent application is hereby incorporated by reference in its entirety.

BACKGROUND OF THE INVENTION

1. Field of the Invention

The present invention relates to scan systems, such as those using scanning electron microscope (SEM) or atomic force microscopy (AFM). In particular, the present invention relates to how to build a fast scan system.

2. Discussion of the Related Art

In a conventional scan system (e.g., SEM, scanning tunneling microscope (STM), AFM, magnetic force microscopy (MFM), single-dish radio telescopes, scanning radar system, or a scanning laser Doppler system), a scanner scans the target line-by-line. Often the scan time is so long that it requires a lot of resources (e.g., money, energy) to run such a scanner. In some other case, since the scan time is long, it is difficult to scan a dynamically changing target.

SUMMARY

The present invention provides a method for building a fast scan system. Under this method, a scanner moves the scan sensors faster than scanners of the prior art, even though the total distance that the scan sensors move longer.

According to one embodiment of the present invention, a scan system includes (a) a scan sensor that measures the scan target by moving around it, and (b) a data processing system that calculates a parameter of the scan target from the collected data.

According to one embodiment of the present invention, the scan sensor, which has a limited sensing bandwidth, is moved along multiple paths along the target. The scan speed is faster than the scan speed determined by the scan sensor bandwidth, so as to obtain a clear signal directly from the scan sensor output. The target is then recovered from the scan output using a compressed sampling data recovery data processing method.

The present invention is better understood upon consideration of the detailed description below in conjunction with the accompanying drawings.

BRIEF DESCRIPTION OF THE DRAWINGS

FIG. 5 illustrates the relationship between 2DCT of the target and 1DFT of the output of a scan sensor when the scan sensor is only sensitive at low frequencies for a ping-pong scan.

FIG. 10 illustrates an example of a Lissajous-like scan path.

DETAILED DESCRIPTION OF THE PREFERRED EMBODIMENTS

Scan System

Figure 1:
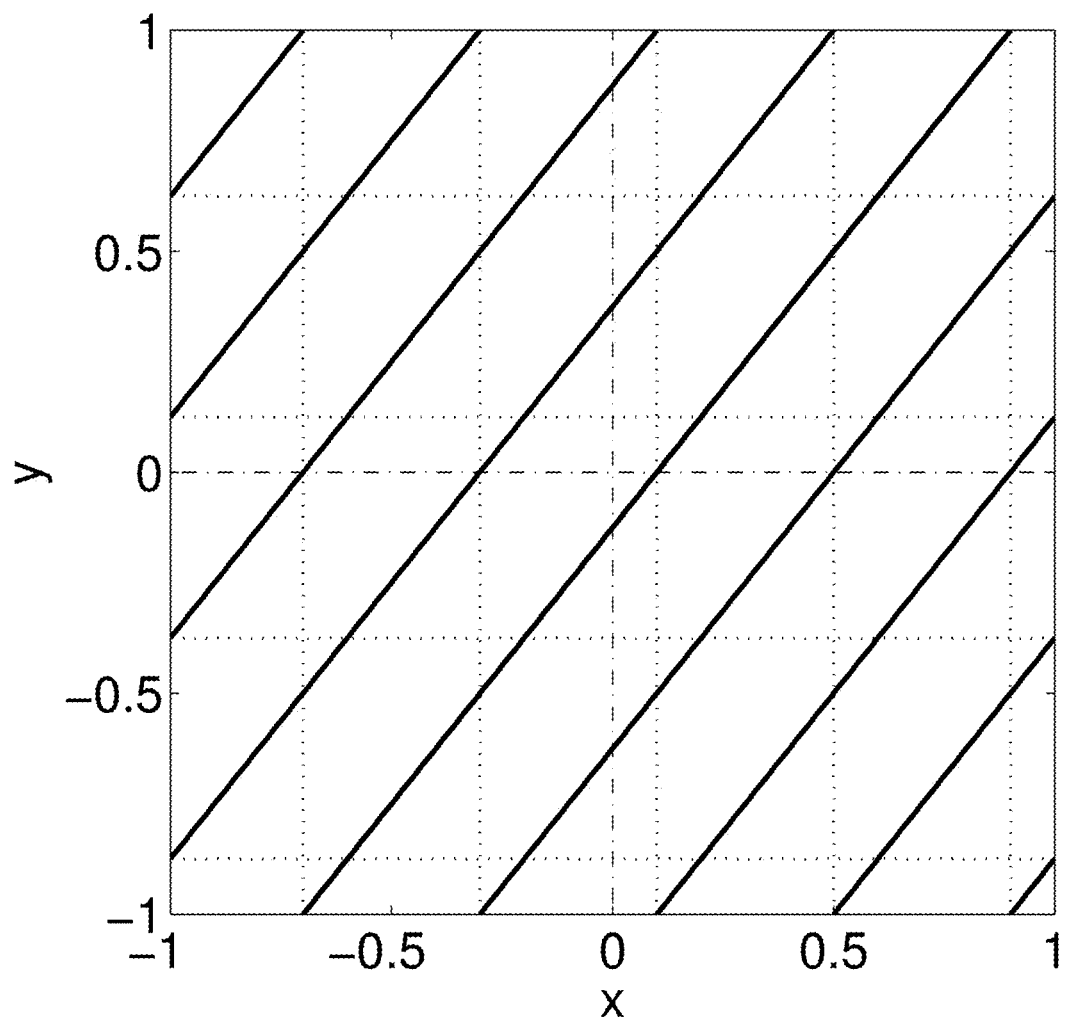
FIG. 1 illustrates an example of a periodic Torus scan path with $x=1$, $y=1$, $n_x=4$, $n_y=5$, $x_0=0.1$ and $y_0=0$.

According to one embodiment of the present invention, scan system includes (a) scan sensor that measures the scan target by moving around it and (b) a data processing system that calculates the scan target from the collected data.

The present application is applicable to a scanning electron microscope (SEM), scanning tunneling microscope (STM), atomic force microscope (AFM), magnetic force microscopy (MFM), single-dish radio telescopes, scanning radar system, scanning laser Doppler system, and so on.

Scan Target

A scan system measures a physical parameter of a scan target. For example, in a SEM system, the target can be a surface morphology of a computer chip. For another example, in a radar system, the target can be objects in an area of the sky. The target can be 2-dimensional or 3-dimensional.

Scan Sensor

A scan sensor is the device in a scan system that measures a physical value of the target at or around a "scan sensing location" on the target. The system may move the scan sensing location on the target and thus measure a spatial property of the target. The path traversed by a sensing location on the target, as it is being moved about, is called a scan path. In a preferred embodiment, the scan sensor's output and the scan sensing location are each measured as a function of time and is sent to a data processing system to calculate the physical parameter of the target. Many scan sensors, their sensing locations, and methods for collection of scan sensor output data and sensing location data are known in existing scan systems, such as SEM, STM, AFM, MFM, single dish telescopes and scanning radar systems. In these systems, a scan sensor may take different forms and may be moved in different ways. For example, in an AFM system, a sensor may be a small cantilever with a sharp tip at the end, which measures an atomic force of the target while it is moved by a piezo actuators in, for example, orthogonal ("x" and "y") directions. The sensor is often most sensitive when the scan output is around the natural frequency of the cantilever.

As another example, in a SEM system, an electron beam is directed at the target. The electron beam is moved by deflection coils to scan a target area. An electron detector or an x-ray detector measures the electron or x-ray scattered from the target when the electron beam is directed at different locations.

As another example, in a laser Doppler system, a laser beam is directed at the target. A mirror that rotates in two directions can direct the laser beam in many different directions. A laser Doppler sensor measures the velocity of the target when the laser beam is pointed to different directions.

Sensors of a scan system often have limited bandwidth, which often limits their available scan speeds. For example, the cantilevers used in an AFM system are only sensitive around the resident frequency, the electron detector used in an SEM might be sensitive only at low frequencies; the bolometer used in radio telescope only has limited response time; the analog-to-digital converters in different kinds of scan systems only have limited sampling frequency.

Scan Method

In many traditional scan systems, a scan sensor has to be moved slowly enough to avoid blurring the scan signal. Particularly, the scan speed should be slow enough that the bandwidth of the scan output is less than the bandwidth of the sensor. Denoting the measurement result (the final output of the whole scan system) of the scan system as $T_m(x,y)$, the scan sensor's sensitive location, $(x(t),y(t))$, may be moved as a function of time. In a traditional scan system, the bandwidth of the apparent scan output, defined as $g_m(t)=T_m(x(t),y(t))$, is less than the bandwidth of the sensor.

According to one embodiment of the present invention, the scan sensor may be moved at a faster speed than the traditional scan system. While the scan output may be blurred because of the higher speed, the target image may be recovered from the blurred signal by a data processing system. As a result, the apparent scan output can have a bandwidth that is wider than the sensor bandwidth.

Scan Paths

The scan path is designed both to provide an effective cover of the target, and to be easily operable by the system.

Multiple Paths

According to one preferred embodiment, the scan sensor is moved along multiple scan paths. The scan paths are designed so that one or more different aspects of the target are measured by a different path.

Continuous Scan Path

In a preferred embodiment, the scan paths are continuous lines. The benefit is that the scan output is continuous and hence its does not have high frequency components that are caused by sudden jumps in the signal. Another benefit is that the scan sensor is kept on the target continuously because, in some systems, moving a scan sensor out of the target is difficult or slow.

Closed Scan Path

In a preferred embodiment, the scan paths are closed (i.e., the ending point results from steering the scan path back to the ending point). One advantage is that if the scan sensor moves along the scan line repetitively, its output is periodic and continuous. It is preferred to scan the target along the scan path an integer number of times because, so doing, the Fourier transform of the scan output only has values that are integer multiples of the scan frequency. Here, scan frequency equals 1 over the time required for a sensor to be moved along the scan path once. One benefit is that the frequency aliasing problem, which happens for non-repetitive signals, can be avoided. Another benefit is that if the signal-to-noise ratio of the scan sensor output is not high, the scan path may be repeated multiple times and noise is reduced by the averaging process.

Closed Scan and Spatial Transform

In one preferred embodiment, the scan path, or the set of scan paths, are designed so that there is each frequency band of the scan sensor output are contributed, or mainly contributed, by a portion of the spatial frequency components of the target. For different scan paths, different portion of the spatial frequency components contribute to different frequency bands of the sensor output. These scan paths are called selecting scan paths. The advantage of a selecting scan path is that it enables selecting a desired spatial transform components by the use of different scan paths. For example, one method makes the spatial components measured by a set of scan paths to be well-distributed in the spatial transform space. As another example, one method may avoid measuring same components repetitively by the use of different scan paths.

Figure 12:
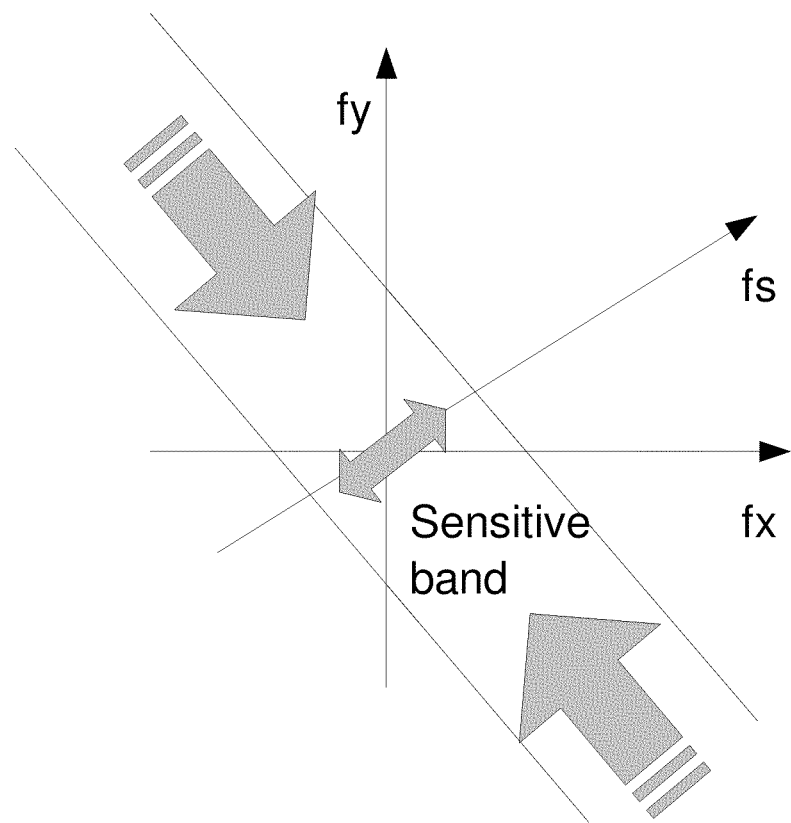
FIG. 12 illustrates a frequency selection of a linearly selecting scan path.

One set of selecting scan paths are referred to as linear selecting scan paths. In such scan paths, a linear relationship exists between the spatial frequency components and frequency components of the scan sensor output. FIG. 12 illustrates a frequency selection of a linearly selecting scan path.

Another set of selecting scan paths are referred to as projecting scan paths. In a projecting scan path, each frequency component of the scan sensor output is contributed by only a finite number of spatial frequency components of the target. One advantage of a projecting scan path is that it facilitates calculating the expected scan sensor output from the target or calculating the spatial transform components of the target from the scan sensor output. This enables a fast target recovery algorithm in a data processing system.

A different scan path is associated with different spatial transforms. The present invention provides a class of methods for designing scan paths and their relationship with different spatial transforms.

The Torus Scan Path

In a preferred embodiment, the scan paths are provided as Torus paths. The benefit is that there is a simple relationship between the 2DFT of the target and 1DFT of the scan output along the scan path. For a two-dimensional square target, the scan path of a Torus scan can be described by:

$$\begin{cases} x(t) = v_x t + x_0 \bmod 2X; \\ y(t) = v_y t + y_0 \bmod 2Y. \end{cases}$$

where t denotes time, $v_x$ denotes the velocity in x direction and $v_y$ denotes the velocity in y direction. The target is within the range from $-X$ to $X$ and from $-Y$ to $Y$.

To make the path closed, $$\begin{cases} v_x = 2X n_x \frac{1}{T}; \\ v_y = 2Y n_y \frac{1}{T}. \end{cases}$$

where T is the scan period. $n_x$ and $n_y$ are integers that called scan numbers. $n_x$ and $n_y$ are relatively prime to each other.

The 2DFT component at frequency $(f_x, f_y)$ with amplitude $G(f_x, f_y)$ contributes to the scan sensor output:

$$G(f_x, f_y) e^{j 2\pi \left[ (f_x n_x + f_y n_y) \frac{t}{T} + \frac{f_x x_0}{2X} + \frac{f_y y_0}{2Y} \right]}$$

which has frequency at $$f_s = \frac{1}{T}(f_x n_x + f_y n_y).$$

This equation is referred to as the scan frequency equation.

The scan frequency equation shows that the 2DFT components of the target are linearly projected to the 1DFT components of the scan sensor output. If the scan sensor has a limited bandwidth, the scan sensor output comes from a 'strip' of 2DFT components of the target in the spatial frequency domain. Only the frequency components within the strip can be measured by the band limited sensor.

If a different scan path with a different $(n_x, n_y)$ is used, the result is a rotation of the measured strip in the spatial frequency domain of the target. Hence, we can select a set of strips in the spatial frequency domain to measure by selecting different $(n_x, n_y)$ according to the scan frequency equation.

Denoting integer $n_s = f_s T$ as the scan frequency number, $$f_s = f_x n_x + f_y n_y.$$

This equation is referred to as the scan frequency number equation, which is an integer equation, as all its variables are integers. Hence, a 2DFT frequency component at $(f_x, f_y)$ only contributes to 1DFT component at scan frequency number $n_s$. However, it is possible that multiple 2DFT components contribute to the same 1DFT component of the scan output. In fact, the frequency number equation may be used in many different scan paths. Achieving $(n_x, n_y)$ such that only one 2DFT component contributes to each 1DFT component of the scan sensor output, and solving the frequency number equation in general, are discussed in the section in the following which introduces the scan number equation.

The relationship between the 2DFT components of the target and the 1DFT components of the scan sensor output enables a fast calculation of the expected scan output from the target using the fast Fourier transform. One can simply calculate the 1DFT component from 2DFT components by solving the scan number equation.

FIG. 1 illustrates an example of a periodic Torus scan path with x=1, y=1, $n_x$=4, $n_y$=5, $x_0$=0.1 and $y_0$=0.

Figure 3:
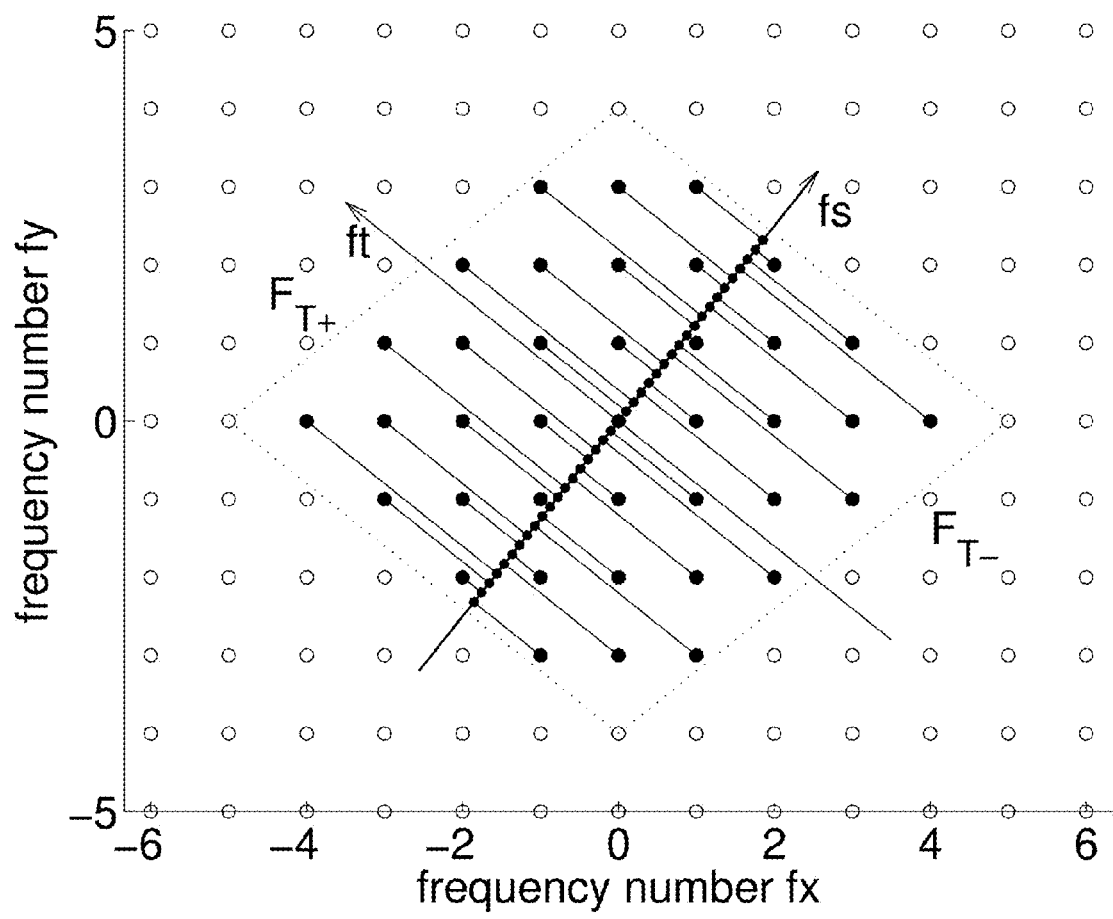
FIG. 3 illustrates an example of a projection from spatial 2DFT components of a target to 1DFT components of the output of a scan sensor for a Torus scan.
Figure 4:
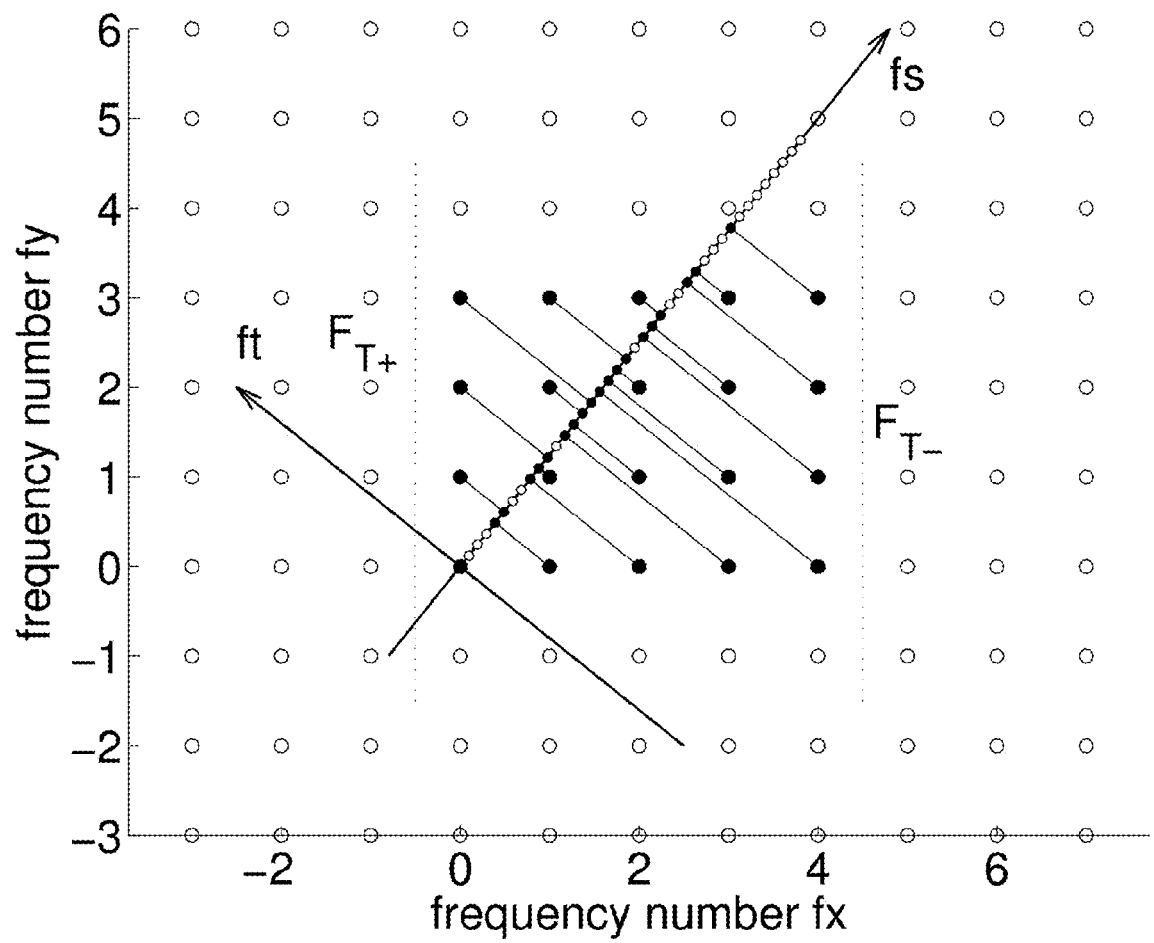
FIG. 4 illustrates another example of a projection from spatial 2DFT components of a target to 1DFT components of the output of a scan sensor for a Torus scan.
Figure 6:
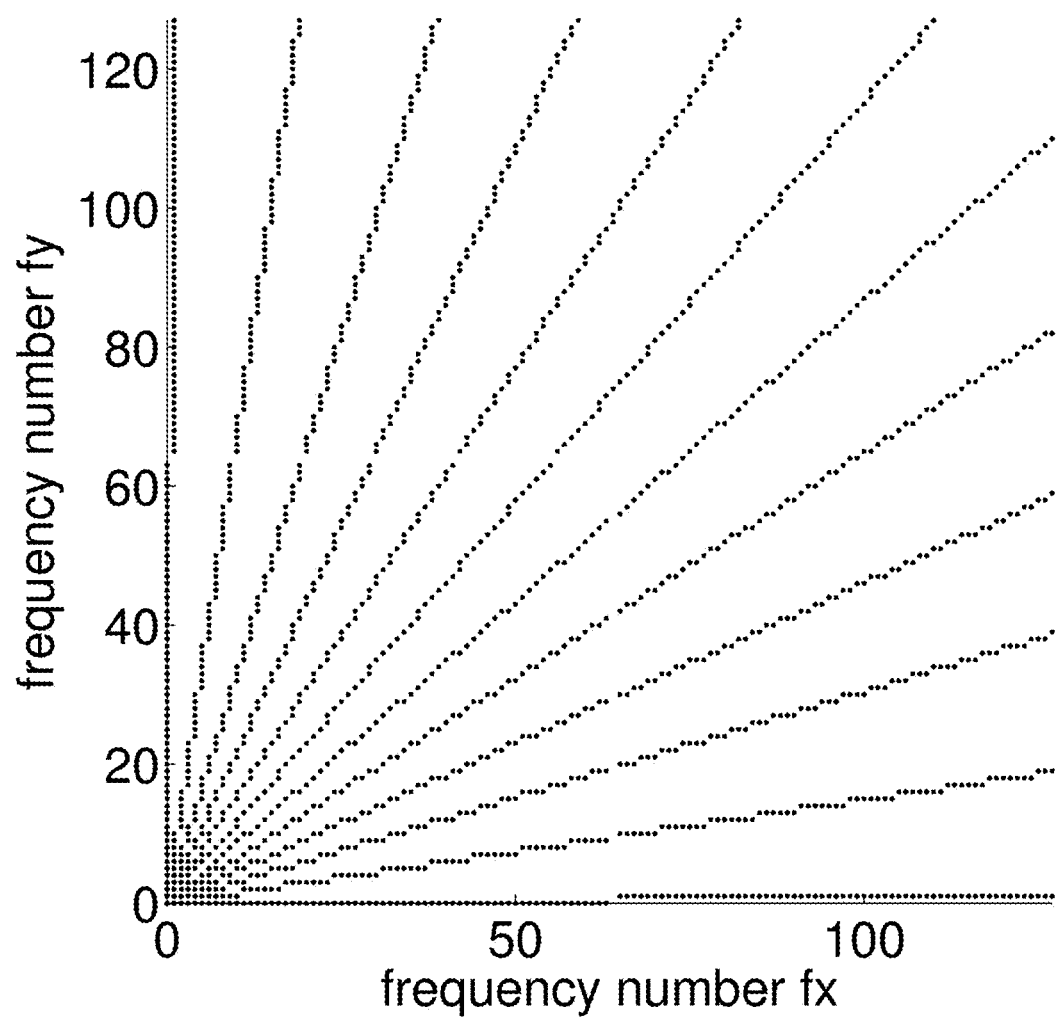
FIG. 6 illustrates an example for selecting suitable scan numbers.

FIG. 3 illustrates an example of a projection from spatial 2DFT components of a target to 1DFT components of the output of a scan sensor for a Torus scan. FIG. 4 illustrates another example of a projection from spatial 2DFT components of a target to 1DFT components of the output of a scan sensor for a Torus scan. FIG. 6 illustrates an example for selecting suitable scan numbers.

The Ping-Pong Scan

The ping-pong scan is a wrapped linear scan, having the wrapping function:

$$R(u, U) = \begin{cases} u \bmod U, & \text{if } \left[\frac{u}{U}\right] \text{ even}; \\ U - (u \bmod U), & \text{if } \left[\frac{u}{U}\right] \text{ odd}. \end{cases}$$

where $U$ is the wrapping boundary, and $[\cdot]$ is the floor function.

The path of a constant speed ping-pong scan is given by $$\begin{cases} x(t) = R(v_x t + x_0, X); \\ y(t) = R(v_y t + y_0, Y). \end{cases}$$

Note the target for a ping-pong scan is defined on $x \in [0, X]$ and $y \in [0, Y]$. The ping-pong scan is both periodic and continuous.

Denoting the two dimensional cosine transform (2DCT) of the target as $$C(f_x, f_y) = \int_0^Y \int_0^X g(x, y) \cos\left(\pi \frac{f_x x}{X}\right) \cos\left(\pi \frac{f_y y}{Y}\right) dx dy.$$

The 2DCT component at $(f_x, f_y)$ contributes to 1DFT component of the scan sensor output at frequency $$f_s = \frac{1}{T}(f_x n_x + f_y n_y).$$

This is the same scan frequency equation as the scan frequency equation discussed in the Torus scan section above. The scan number equation for a ping-pong scan is also the same scan number equation for the Torus scan:

$$f_s = f_x n_x + f_y n_y.$$

The 1DFT component with scan frequency number $n_s$ is $$g(n_s) = \sum_{n_s = f_x n_x + f_y n_y} 4C(f_x, f_y).$$

Thus, $g(n_s)$ is the sum of all the 2DCT components that have the same $n_s = f_x n_x + f_y n_y$. Achieving $(n_x, n_y)$ such that only one 2DCT component contributes to one 1DFT component of the scan sensor output, and solving the frequency number equation in general, are discussed in the section which introduces the scan number equation.

Figure 2:
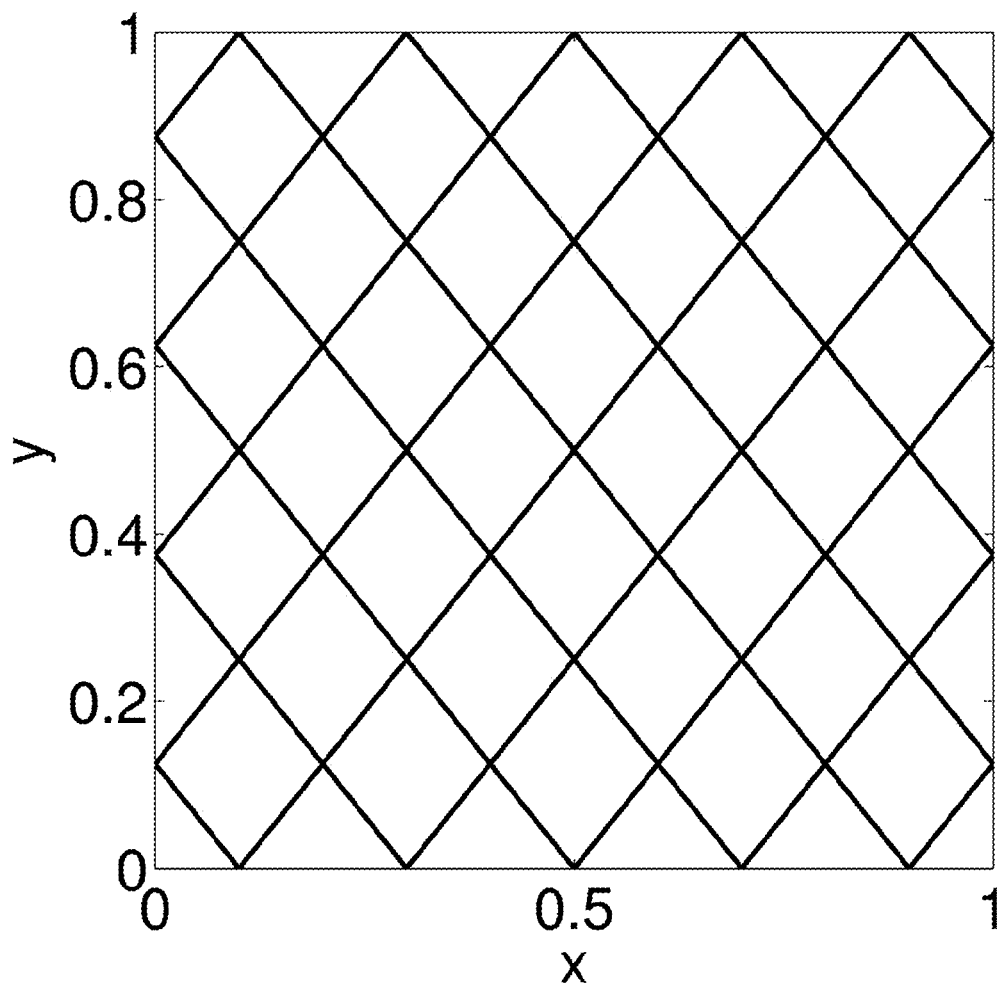
FIG. 2 illustrates an example of a Ping-pong scan path with $x=1$, $y=1$, $n_x=4$, $n_y=5$, $x_0=0.1$ and $y_0=0$.
Figure 7:
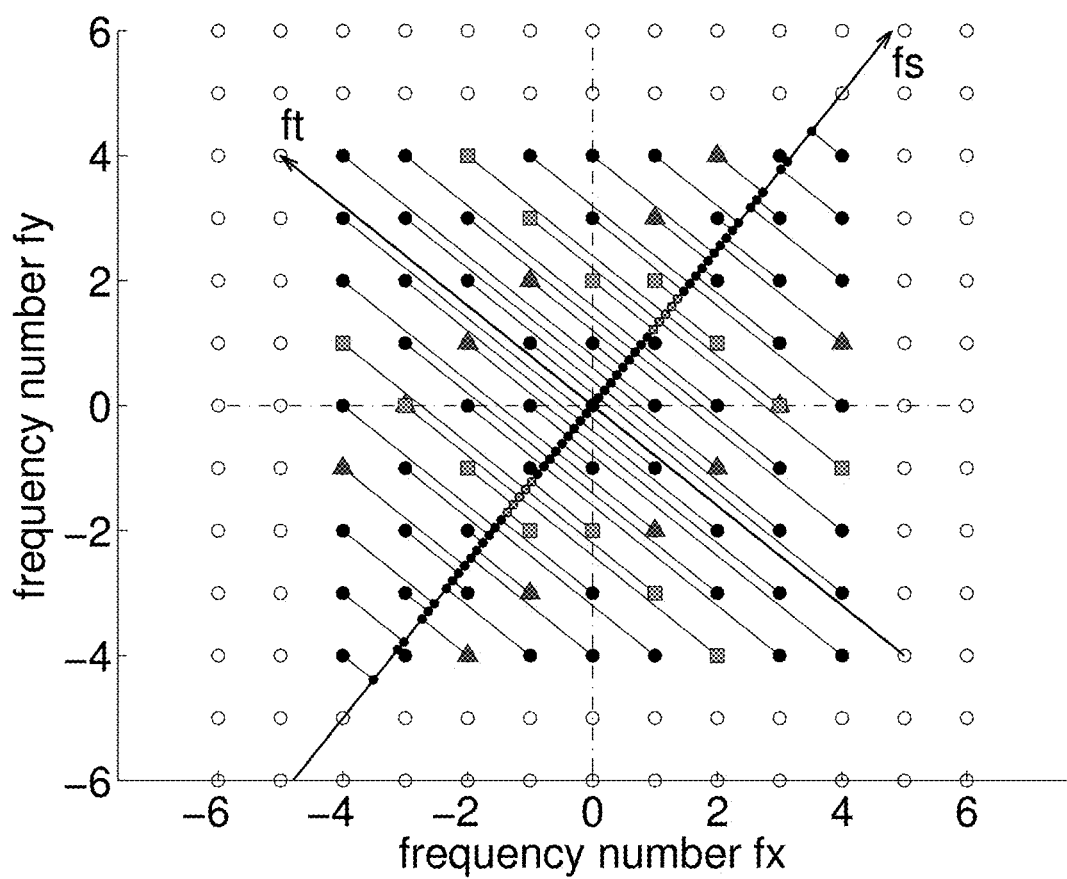
FIG. 7 illustrates an example 2DCT component that can be measured by a band pass scan sensor for a ping-pong scan.
Figure 8:
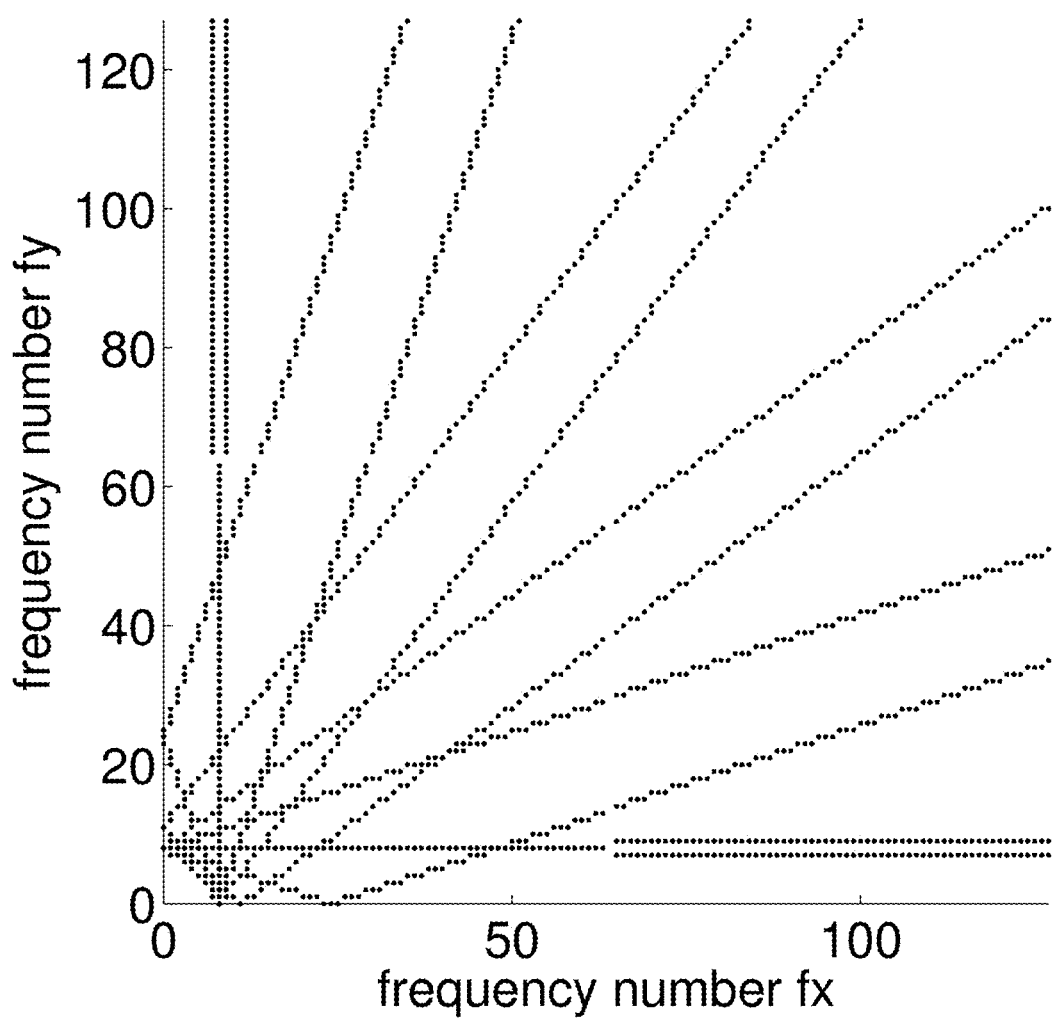
FIG. 8 illustrates another example 2DCT component that can be measured by a band-pass scan sensor for a ping-pong scan.
Figure 13:
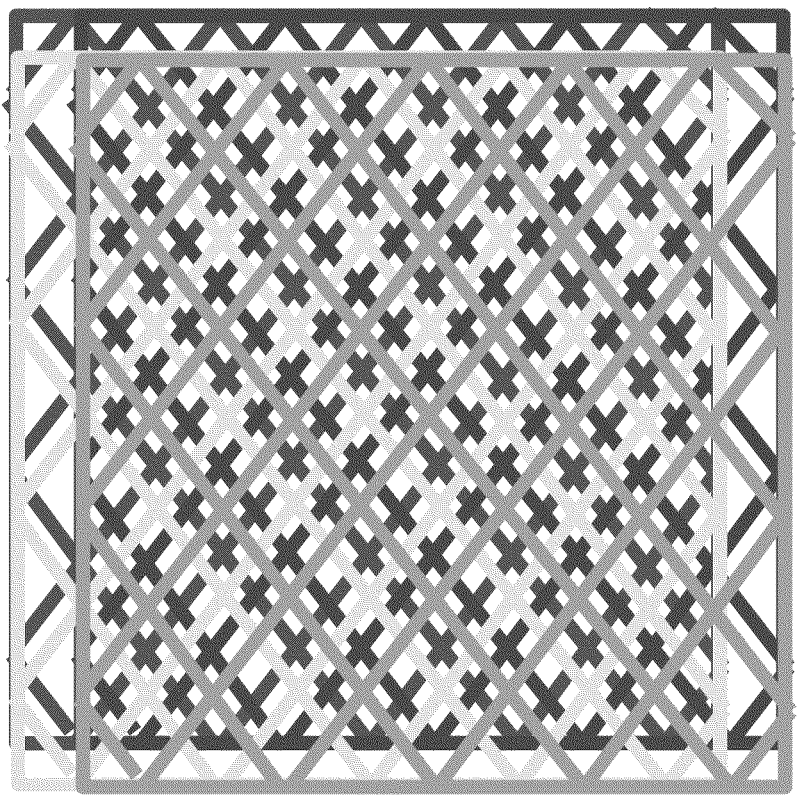
FIG. 13 illustrates an example of a ping-pong scan with a two-dimensional scan sensor array. There are four sensors in the figure, forming a 2-by-2 array, each sensor having a different offset and a different scan area.
Figure 14:
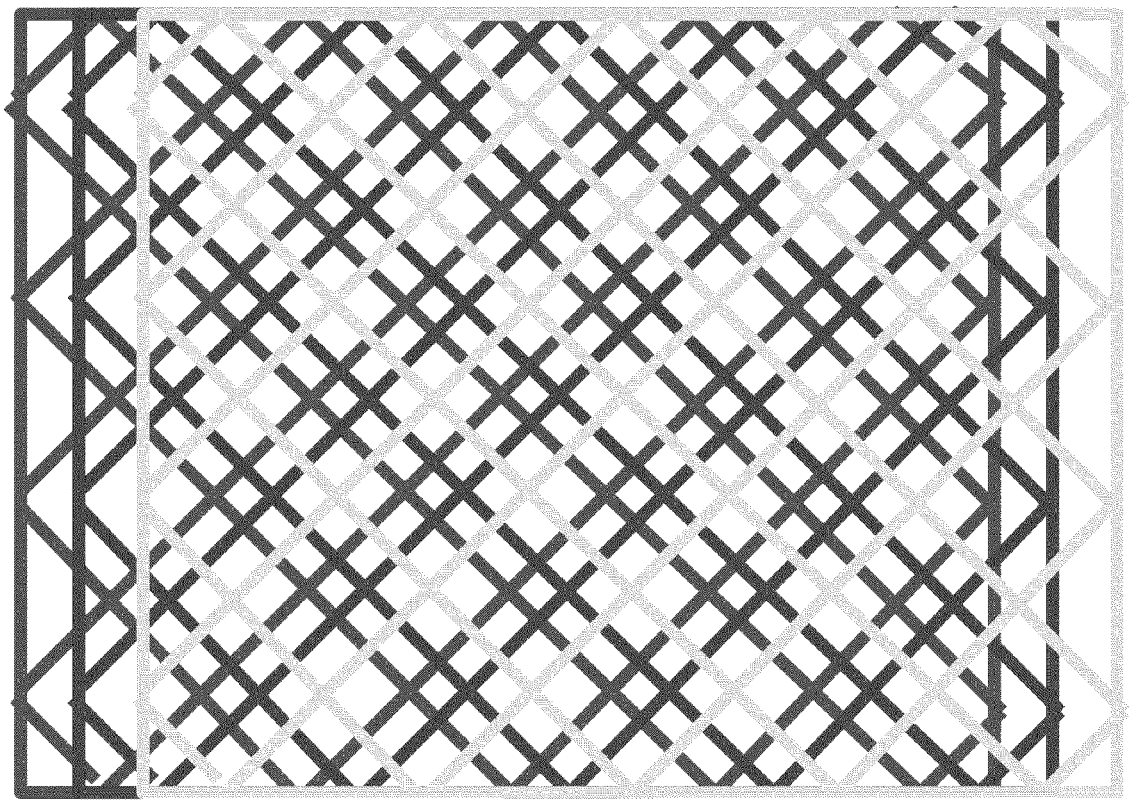
FIG. 14 illustrates an example of a ping-pong scan with a linear scan sensor array. There are 3 sensors in the figure, forming a 1-by-3 array, each sensor having a different offset and a different scan area.

FIG. 2 illustrates an example of a Ping-pong scan path when x=1, y=1, $n_x$=4, $n_y$=5, $x_0$=0.1 and $y_0$=0. FIG. 5 illustrates the relationship between 2DCT of the target and 1DFT of the output of a scan sensor when the scan sensor is only sensitive at low frequencies for a ping-pong scan. FIG. 7 illustrates an example 2DCT component that can be measured by a band pass scan sensor for a ping-pong scan. FIG. 8 illustrates another example 2DCT component that can be measured by a band-pass scan sensor for a ping-pong scan. FIG. 13 illustrates an example of a ping-pong scan with a two-dimensional scan sensor array. There are four sensors in the figure, forming a 2-by-2 array, each sensor having a different offset and a different scan area. FIG. 14 illustrates an example of a ping-pong scan with a linear scan sensor array.

A Scan with a Continuous Velocity

In some embodiments, it is much easier to implement scan paths with a continuous scan velocity.

The Lissajous Scan

In on embodiment, the scan paths can be designed as a Lissajous scan, which is given by:

$$\begin{cases} x_L(t) = \cos\left(\pi\frac{(v_x t + x_0)}{X}\right); \\ y_L(t) = \cos\left(\pi\frac{(v_y t + y_0)}{Y}\right). \end{cases}$$

A Lissajous scan can be made periodic by:

$$\begin{cases} v_x = 2X v n_x; \\ v_y = 2Y v n_y. \end{cases}$$

Such a Lissajous scan is periodic with a continuous path and a continuous velocity.

The spatial transform associated with a Lissajous scan is the Two-dimensional Chebyshev polynomial transform (2DCPT) of the 2-dimensional spatial function $f(x,y)$.

$$\alpha(c_x, c_y) = \frac{4}{\pi^2}\int_{-1}^{1}\int_{-1}^{1} T_{c_x}(x) T_{c_y}(y) f(x,y) \frac{dxdy}{\sqrt{(1-x^2)(1-y^2)}}.$$

where $T_n$ is Chebyshev polynomials of the First Kind. $T_n$ is defined as:

$$T_n(x) = \cos(n \arccos x).$$

$f(x,y)$ can be calculated from its 2DCPT as $$f(x,y) = \sum_{c_x=0}^{\infty}\sum_{c_y=0}^{\infty} \alpha(c_x, c_y) T_{c_x}(x) T_{c_y}(y)$$

The scan frequency equation for a Lissajous scan is given by:

$$f_s = \frac{1}{T}(c_x n_x + c_y n_y)$$

The scan number equation for a Lissajous scan is given by:

$$n_s = c_x n_x + c_y n_y.$$

Achieving $(n_T, n_y)$ such that only one 2DCPT component contributes to one 1DFT component of the scan sensor output, and solving the frequency number equation in general, are discussed in the section introducing the scan number equation.

Figure 9:
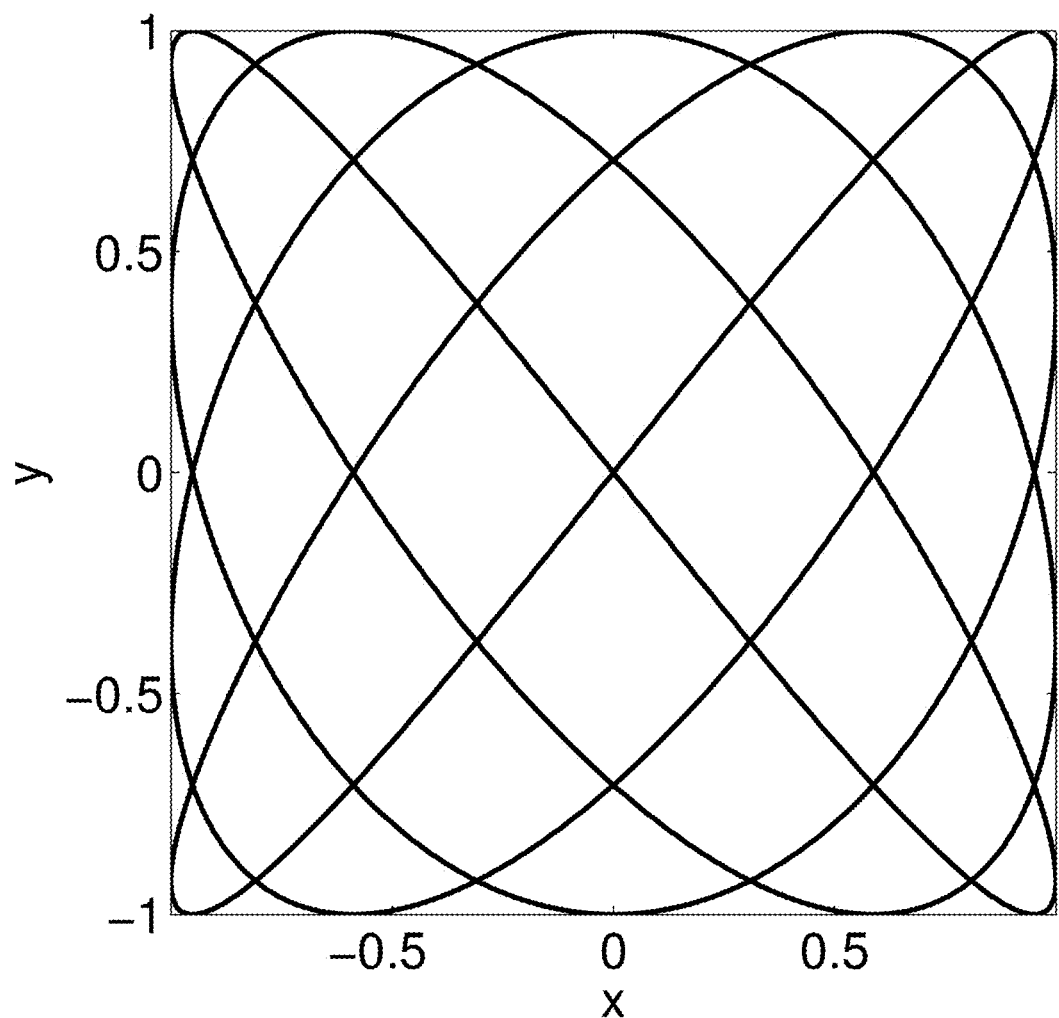
FIG. 9 illustrates an example of a Lissajous scan path.

FIG. 9 illustrates an example of a Lissajous scan path.

The General Lissajous scan

In some embodiments, other scan paths may be provided to meet the specific needs of a system. For example, one may construct a target function $K_n(x)$ as:

$$\begin{cases} K_n = \cos(nt) \\ x = h(R(t,1)) \end{cases}$$

$R(u, U)$ is the wrapping function which is discussed above in conjunction with the ping-pong scan.

$$R(u, U) = \begin{cases} u \bmod U; & \text{if } \left[\frac{u}{U}\right] \text{ even}; \\ U - (u \bmod U); & \text{if } \left[\frac{u}{U}\right] \text{ odd}. \end{cases}$$

where U is the wrapping boundary.

$h(t)$, referred to as a template function, is a function defined on $t \in [0,1]$. $h(t)$ is preferably continuous and increasing. Denoting the derivative of $h(t)$ with respect to t as $h'(t)$, $K_n$ forms a sequence of orthogonal polynomials with respect to the weight function $$\frac{1}{h'(t)}:$$

$$\int_{-1}^{1} K_n(x) K_m(x) \frac{dx}{h'(t)} = \begin{cases} 0 & : n \neq m \\ \pi & : n = m = 0 \\ \pi/2 & : n = m \neq 0 \end{cases}$$

Using the target function, a scan path may be provided as $$\begin{cases} x = h_x(t) \\ y = h_y(t) \end{cases}$$

where $h_x(t)$ and $h_y(t)$ are template functions in x and y direction respectively.

The target function in the x direction is denoted as $K_{c_x}(x)$, and the target function in the y direction is denoted as $J_{c_y}(y)$.

$$\begin{cases} K_{c_x}(t) = \cos(c_x t) \\ x(t) = h_x(t) \end{cases}$$

$$\begin{cases} J_{c_y}(t) = \cos(c_y t) \\ x(t) = h_y(t) \end{cases}$$

For a two-dimensional image, the 2-dimensional K transform (2DKT) is given by as:

$$f(x,y) = \sum_{c_x=0}^{\infty}\sum_{c_y=0}^{\infty} \beta(c_x, c_y) K_{c_x}(x) J_{c_y}(y) \text{ where}$$

$$\beta(c_x, c_y) = \frac{4}{\pi^2}\int_{-1}^{1}\int_{-1}^{1} K_{c_x}(x) J_{c_y}(y) f(x,y) \frac{dxdy}{h'_x(x) h'_y(y)}.$$

The scan frequency equation for 2DKT and the scan sensor output are given by:

The scan frequency equation for general Lissajous scan is given by:

$$f_s = \frac{1}{T}(c_x n_x + c_y n_y)$$

The scan number equation for the general Lissajous scan is given by:

$$n_s = c_x n_x + c_y n_y$$

For example, in one embodiment, $h_x$ and $h_y$ are provided to be:

$$h_x(t) = h_y(t) = h(t) = \begin{cases} \dfrac{r - 1/2 - \sqrt{r^2/2 - t^2}}{1 - (2 - \sqrt{2})r} + 1/2 & l0 \le t \le r \\ \dfrac{t - 1/2}{1 - (l2 - \sqrt{2})r} + 1/2 & r \le t \le 1 - r \\ \dfrac{1/2 - r + \sqrt{r^2/2 - (t-1)^2}}{1 - (2 - \sqrt{2})r} + 1/2 & 1 - r \le t \le 1 \end{cases}$$

FIG. 10 shows an example of a Lissajous-like scan path, in which h(t) has two arcs are connected at the two ends of the strait line to keep the function smooth. The scan path is shown in FIG. 10. One advantage of this scan path is that the majority of the center part is evenly distributed straight lines, which enable an evenly distributed data collection. At the same time, it maintains both the scan path and the scan velocity smooth, which makes scan motion easier.

Daisy Scan

In one embodiment, where the target is round, a scan path may be provided as $$h(t) = \begin{cases} \theta = 2\pi n_\theta t; \\ r = \cos(2\pi n_r t). \end{cases}$$

The associated spatial transform is given by:

$$g(r, \theta) = \Sigma\Sigma G(f_r, f_\theta) e^{jf_\theta \theta} T_{f_r}(r)$$

The scan frequency equation is given by:

$$f_s = \frac{1}{T}(f_\theta n_\theta + c_r n_r)$$

The scan number equation is given by:

$$n_s = f_\theta n_\theta + f_r n_r$$

Figure 11:
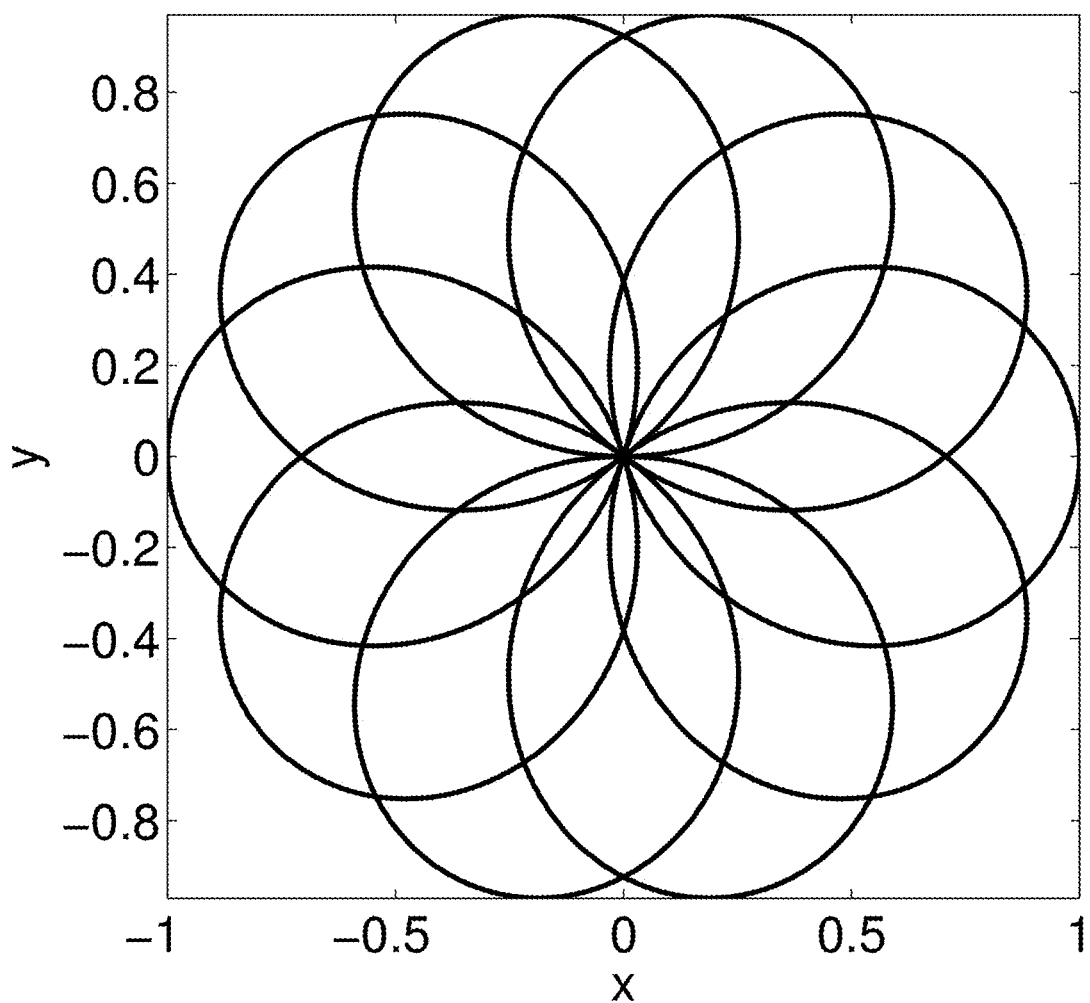
FIG. 11 illustrates an example of a daisy scan path.

FIG. 11 illustrates an example of a daisy scan path.

Symmetric Properties of Spatial Transform

For a Ping-pong Scan, a Lissajous Scan (or another Lissajous-like scan) and similar scan paths, the associated transforms are symmetrical. For example for 2DCT, $$C(f_x, f_y) = C(-f_x, f_y) = C(f_x, -f_y) = C(-f_x, -f_y)$$

Therefore, when one of the four values are known, all four values are known. For a Torus Scan, the 2DFT of the target has conjugate symmetry:

$$g(f_x, f_y) = \text{conj}(g(f_x, f_y))$$

$$g(f_x, f_y) = \text{conj}(g(-f_x, f_y))$$

These symmetry properties may be used to calculate the spatial frequency components from the 1DFT of the sensor output.

Calculating Two Spatial Components from One 1DFT Components of the Sensor Output For a Ping-pong Scan, a Lissajous Scan (or a Lissajous-like scan) and similar scan paths, the spatial transform has real value. The 1DFT of the scan path is a complex value (i.e., having both a real part and an imaginary part). Hence, two spatial components that contribute to the same 1DFT component can be reconstructed from solving a set of 2 linear equations. One way for calculating the spatial components is to find the offset of the scan path $(x_0, y_0)$ so that the conditional number of the linear equations is small.

For example, when $y_0 = 0$ the linear equation is.

$$\begin{bmatrix} \Re G_s(f_s) \\ \Im G_s(f_s) \end{bmatrix} = 4Q \begin{bmatrix} C(f_{x1}, f_{y1}) \\ C(f_{x2}, f_{y2}) \end{bmatrix}, \text{where}$$

$$Q = \begin{bmatrix} \Re q(f_{x1}) & \Re q(f_{x2}) \\ \Im q(f_{x1}) & \Im q(f_{x2}) \end{bmatrix}, \text{where}$$

$$q(f_x) = e^{j\pi f_x \frac{x_0}{X}}$$

The offset to for optimal conditional number is given by: when $$\frac{n_y x_0}{X} = \frac{\pi}{2}.$$

The Scan Number Equation
Design Scan numbers

In one embodiment, $(n_x, n_y)$ is provided so that there is only one 2DFT frequency component that contributes to one 1DFT frequency component at $n_s$. One way to provide such $(n_x, n_y)$ is to find $(n_x, n_y)$ that satisfies:

$$\begin{cases} f_x n_y - f_y n_x < F_{T+} \\ f_x n_y - f_y n_x > F_{T+} \\ F_{T+} - F_{T-} \le (n_x^2 + n_y^2) \end{cases} \quad (1)$$

Since and $F_{T+}$ and $F_{T-}$ grow linearly with $n_x$ and $n_y$, and the right-hand side of the third inequality grows quadruply with $n_x$ and $n_y$, if $f_x$ and $f_y$ are bounded (i.e., when the amplitude of the 2DFT is significant only when $F_{x-} \le f_x \le F_{x+}$ and $F_{y-} \le f_y \le F_{y+}$), one can always increase $n_x$ and $n_y$ until all three inequalities are satisfied.

In one embodiment, for all significant 2DFT terms, $f_x$ and $f_y$ are $l_1$ limited by:

$$\left|\frac{f_x}{N_y}\right| + \left|\frac{f_y}{N_x}\right| < 1 \quad (2)$$

One can then find any two relatively prime numbers $n_x$ and $n_y$ that satisfy $$\begin{cases} n_x \ge N_x \\ n_y \ge N_y \end{cases}$$

Since, from equation (2) one obtains $F_{T+} - F_{T-} \le (n_x^2 + n_y^2)$.

In one embodiment, the 2DFT terms are band-limited (i.e., significant only at $$F_x + \epsilon > f_x > \epsilon)$$

where $F_x$ is the bandwidth.

From (1), $$\begin{cases} F_{T+} = (F_x + \epsilon)\frac{n_x^2 + n_y^2}{n_y} - f_s\frac{n_x}{n_y} \\ F_{T-} = \epsilon\frac{n_x^2 + n_y^2}{n_y} - f_s\frac{n_x}{n_y} \end{cases}$$

Hence, $$F_{T+} - F_{T-} = \frac{F_x}{n_y}(n_x^2 + n_y^2)$$

Therefore, when one has $n_y \geq F_x$, only one 2DFT frequency components can contribute to each 1DFT frequency component of the scan output.

In one embodiment, the 2DFT terms are band-limited in both the x and y directions:

$$\begin{cases} F_X + \epsilon_x > f_x > \epsilon_x; \\ F_Y + \epsilon_y > f_y > \epsilon_y, \end{cases}$$

Thus, from the previous example, only one 2DFT frequency component can contribute to each 1DFT frequency component of the scan output, when: $n_y \geq F_x$ or $n_x \geq F_y$. For example, when $F_x = 128$ and $F_y = 128$, for all the following $(n_x, n_y)$ pairs, there is only one 2DFT component that contribute to one 1DFT component of the scan output:
(128, 127), (128, 95), (128, 63), (128, 31), (128, 1), and (127, 128), (95, 128), (63, 128), (31, 128), (1, 128).

Solving the Scan Number Equation

The scan number equation can be solved by finding $(f_x, f_y)$, or a set of $(f_x, f_y)$ for a given $(n_x, n_y)$ and $n_s$ is known from Number Theory. One way is to build a look-up table from all possible $(f_x, f_y)$ to $n_s$ for each $(n_x, n_y)$, so that the corresponding $(f_x, f_y)$ may be looked up from $n_s$.

Calculating the Target from the Scan Sensor Output

Data collected from scan sensors may be sent to a data processing system to recover the original target.

The Sparse Sampling Recovery Method

In one embodiment, the target is assumed to be sparse. For example, in one embodiment, the target is assumed sparse in a certain transformed space of the target ("the sparse space"; i.e., a significant amount of data points are zeros, or close to zeros, or just noise). In another example, in one embodiment, the target is assumed have a limited variance.

Sparse sampling recovery techniques may be used to recover the target from the scan sensor output. Many sparse sampling recovery methods are known to those skilled in the art. For example, "l1-magic" is a software package suitable for solving sparse sampling recovery problems. "l1-magic" may be obtained from at http://www.acm.caltech.edu/l1magic/ or from its creators, E. Cands and J. Romberg. One example of a sparse target to which the sparse sampling recovery method is applicable is the sky in dark night: most of the target is black except for the luminous stars. In this case, the target can be recovered by solving the convex problem $$\min\|z\|_1 \text{ subject to } \|Az-b\|_2 < \epsilon$$

where $\|\cdot\|_1$ denotes the $l_1$ norm, and $\|\cdot\|_2$ denotes the $l_2$ norm, $\epsilon$ represents the allowed error, z is the target, b is the measurement result, and A is the operator that maps the target to the measurement.

As another example, the target is sparse in the wavelet transformed space: i.e., the image's wavelet transform components contain many terms that are zero or close to zero. In that case, the image can be reconstructed by solving the convex problem:

$$\min\|Wz\|_1 \text{ subject to } \|Az-b\|_2 < \epsilon$$

where W denotes the wavelet transform operator.

For example, when the target is mainly continuous except for some cutting boundaries, a recovery technique of total variance can be used. The original target can be calculated by solving:

$$\min\|z\|_{TV} \text{ subject to } \|Az-b\|_2 < \epsilon$$

where $\|\cdot\|_{TV} = \Sigma\sqrt{(x(n+1)-x(n))^2+(y(n+1)-y(n))^2}$ is the total variance operator.

Adjusting the Error Level

The error level E may be determined using the noise level of the sensor.

An Example Using Ping-Ping Scan Paths

In one embodiment, the image is sparse in the wavelet transform space. In that case, multiple Ping-ping scan paths may be used. An operator may calculate the 1DFT components of the sensor output from the target using the scan number equation; the 1DFT scan sensor output may be calculated by FFT. The target may then be calculated by solving $\min\|Wz\|_1$ subject to $\|Az-b\|_2 < \epsilon$ where $\epsilon$ can be determined by pre-known sensor noise, A is the DCT transform operator with component selection (i.e., only selecting the terms that has an item in b).

An Example Using a General Scan Path

In one embodiment, the scan path may be a random-walk on the target, using a low-pass sensor. In this case, the sensor may be modeled as a linear time-invariant system whose output is a linear function of target. The operator A then becomes an operator that maps the target to the sensor output. Vector b becomes the sensor output time history. If the target is assumed sparse in a spatial domain, $$\min\|Z\|_1 \text{ subject to } \|Az-b\|_2 < \epsilon$$

can be used to calculate the target. In general, one can move the scan sensor in any scan path and apply a similar method to measure the target. However, such a method may not be desirable because, first, the data collection is not efficient and, second, the requirement for calculating the A operator is high.

System Operations

The system may operated according to the following three steps.

1. Scanning the target by moving the sensing location on the target and measuring the sensor output and the sensing location (The sensing location may be moved at a higher speed than required by the Nyquist theorem);
2. Based on the measurement mechanism of the scan sensor, finding a relationship between the target and the scan output; and
3. Reconstructing the original target based on this relationship and the scan sensor output.

In one embodiment, the system may be operated according to the following:

1. scanning the target using multiple scan paths:
   Based on different scanning and sensing machines, one may select from many frequency mapping scan paths (e.g., a Torus scan, a ping-pong scan, a Lissajous scan, a Lissajous-like scan, or a daisy scan). In one embodiment, the scan numbers $n_x$ and $n_y$ are chosen such that each 1DFT term of the scan sensor output is contributed by one (or a finite number of) spatial frequency component of the target. The scan numbers may be selected using the method discussed in section Design Scan Numbers.

2. Choosing a scan speed;

The scan speed is chosen to adapt to the number of spatial components that are being measured in the sensing band of the scan sensor. If the scan speed is faster, the number of spatial components measured is smaller.

3. scanning the target along all the different scan paths and collecting the scan output;

During each scan, the data is collected after the sensor reaches a steady state.

4. Taking the Fourier transform of the scan output;

Since the sensor output is periodic, the FFT of the sensor output may be taken for a duration that is an integer multiple of the scan period. The scan sensor may be calibrated, its dynamic response is measured and the sensor's output is normalized in frequency domain. If the sensor's frequency response is $S(f)$ and the FFT of the raw sensor output is $S_r(f)$, the normalized scan output is $$S_n(f) = \frac{S_r(f)}{S(f)}$$

5. Calculating the spatial domain components from 1DFT of the scan output using scan number equation; and 6. Reconstructing the target using a sparse sampling recovery algorithm from the sparsely sampling spatial components.

Design Scan Numbers

Scan numbers may be selected by the following method:

1. estimating the highest spatial frequency of the target, denote as $F_x$, $F_y$;

2. finding a set of directions along which the spatial components of the target may be measured by each scan path; and For example, in one embodiment, when the target is roughly symmetric, the project directions are provided as evenly distributed lines. From the scan frequency equation, the directions of the strips are along directions with slope $$k = -\frac{n_x}{n_y} \text{ in} (f_x, f_y)$$

space.

3. for each project direction, denoting its slope as k, selecting $n_x$ and $n_y$ so that $$-\frac{n_x}{n_y} \approx k$$

and $n_x, n_y$ are relatively prime, and $n_x \geq F_y$ or $n_y \geq F_x$.

Such $n_x, n_y$ may be constructed by the following method:

1. if $$k > \left|\frac{F_x}{F_y}\right|;$$

a. Choose $n_x$ as the smallest integer that is the a power of 2 and $n_x \geq F_y$, (e.g., if $F_y = 101$, choose $n_x = 128$); and b. Choose $n_y$, as the odd integer that is closest to $kn_x$ (e.g., if $k=1$, and $n_x=128$ choose $n_y=127$); and 2, if $$k < \left|\frac{F_x}{F_y}\right|;$$

a. Choose $n_y$, as the smallest integer that is the a power of 2; and $n_y \geq F_x$ and b. Choose $n_x$ as the odd integer that is closest to $kn_y$.

Iterative Operation

In one embodiment, the number of scan paths is determined in an iterative way:

1. selecting a few scan paths and calculating the target;
2. If the target is calculated successfully then stop.
3. Otherwise, adding another one or more different scan lines and calculating the target again;
4. Repeating steps 1-3 until the target is successfully calculated.
5. once the number scan paths is obtained for one target, that same number of scan paths may be used as an initial value for the next target.

The initial number of scan paths may also be decreased.

In one embodiment, the scan speed may be determined in an iterative way:

1. selecting an initial scan speed and calculating the target;
2. if the target is calculated successfully then stop.
3. Otherwise, decreasing the scan speed and calculate the target again.
4. Repeating steps 1-3 until the target is successfully calculated.
5. Once the scan speed is obtained for one target, the same scan speed can be used as the initial value for the next target.

The initial number of scan speeds can also be increased.

Scan System with Multiple Scan Sensors

In some embodiments, more than one scan sensors may be used in the system. In one embodiment, a linear array of CCD sensors is provided for document scanning. In another embodiment, a two-dimensional CCD image chip can be used as the scan sensors. In this system, the scan movement is done either by moving the image chip, or by moving the image, for example, using a moving mirror. In one embodiment, the scan path of each scan sensors is identical except its offset. Such an arrangement makes the scan motion easier to implement.

In one embodiment, the offsets of the scan paths of different sensors are selected so that their scan paths do not overlap. In another embodiment, the scan paths are evenly distributed on the target.

In one embodiment, for each sensor, multiple spatial frequency components contribute to each 1DFT component. In one embodiment, the number of spatial frequency components contributing to each 1DFT component equals the number of scan sensors multiplied by the number of optimal spatial components that contribute to each 1DFT components for a single sensor scan system.

In one embodiment, multiple scan rounds may be provided. In each scan round, the sensors follow a scan path together, but with different offsets. Different scan paths for different rounds may be provided in substantially the same way as a systems with one scan sensor.

During data processing, the measurement operator A maps the target to different 1DFT components from different sensor output in different scan rounds. For each sensor, the scan number equation is used to calculate the 1DFT components in A, where b is the vector of 1DFT components from different sensor outputs in different scan rounds. When calculating the spatial frequency components for each sensor, only the area of the target that is scanned by that sensor is required.

The above detailed description is provided to illustrate the specific embodiments of the present invention and is not intended to be limiting. Numerous modifications and variations within the scope of the invention are possible. The present invention is set forth in the accompanying claims.

I claim:

1. A scan system for scanning a target, comprising:
   a scan sensor providing scan output;
   mechanism for moving a sensing location of the scan sensor along a scan path on the scan target, wherein the mechanism moves the sensing location at a rate such that the scan output has a bandwidth that is higher than a bandwidth of a sensing band of the scan sensor; and
   a data processing system that calculates a physical parameter of the target from the scan output using a sparseness of the target.

2. A scan system as in claim 1, wherein the scan sensor comprises a linear array of sensor elements.

3. A scan system as in claim 1, wherein the scan sensor comprises a 2-dimensional array of sensor elements.

4. A scan system as in claim 1, wherein the mechanism moves the sensing location over multiple scan paths.

5. A scan system as in claim 4, wherein the scan paths comprise one or more closed scan paths.

6. A scan system as in claim 4, wherein the scan paths comprise one or more continuous scan paths.

7. A scan system as in claim 4, wherein frequency components of the sensor output are related by a linear relation to a spatial transform of the target.

8. A scan system as in claim 7, wherein spatial frequency components of the sensor output are selected according to the linear relation.

9. A scan system as in claim 7, wherein the linear relation is used in fast data processing by the data processing system.

10. A scan system as in claim 7, wherein at least one of the scan paths has a portion of its spatial frequency components contributing to the frequency components in the scan sensor's sensing band.

11. A scan system as in claim 10, wherein the scan paths comprise one or more linear selecting scan paths.

12. A scan system as in claim 10, wherein the scan paths comprise one or more projecting scan paths.

13. A scan system as in claim 12, wherein the scan paths include one or more Torus scan paths.

14. A scan system as in claim 13, wherein the spatial transform comprises a Fourier transform.

15. A scan system as in claim 1, wherein the scan paths comprise one or more Ping-pong scan paths.

16. A scan system as in claim 15, wherein the spatial transform is a Cosine Transform.

17. A scan system as in claim 12, wherein the scan paths comprise one or more Lissajous scan paths.

18. A scan system as in claim 17, wherein the spatial transform comprises a Fast Fourier Transform.

19. A scan system as in claim 12, wherein the scan paths comprise one or more Lissajous-like scan paths.

20. A scan system as in claim 19, wherein the spatial transform is a Fast Fourier Transform.

21. A scan system as in claim 12, wherein the scan paths comprise one or more Daisy Scan paths.

22. A scan system as in claim 21, wherein the scan paths include a finite number of spatial frequency components that contribute to each frequency component of the scan sensor's output.

23. A scan system as in claim 22, wherein that finite number is 1.

24. A scan system as in claim 22, wherein that finite number is 2.

25. A scan system as in claim 24, wherein each component of the spatial transform has a real value.

26. A scan system as in claim 25, wherein the two real components are derived from a single frequency component of the scan sensor output.

27. A scan system as in claim 26, wherein a scan path offset is adjusted so that linear equations used have an optimal conditional number.

28. A scan system as in claim 22, wherein the scan system comprises more than one sensor, and wherein the number of spatial frequency components contributing to each frequency component of the scan sensor's output is more than one.

29. A scan system as in claim 28, wherein the number of spatial frequency components that contribute to each frequency component of the sensor output is proportional to number of scan sensor used.

30. A scan system as in claim 28, wherein the number of spatial frequency components that contribute to each frequency component of the sensor output equal to number of scan sensors.

31. A scan system as in claim 1, wherein a Fourier transform of the sensor output is calculated in the data processing system.

32. A scan system as in claim 31, wherein a Fourier transform is calculated for a full cycle of a closed scan path.

33. A scan system as in claim 1, wherein a dynamic response of the scan sensor is normalized by the data processing system.

34. A scan system as in claim 33, wherein a linear relation exists between the target and the scan sensor output.

35. A scan system as in claim 1, wherein the target is sparse in a transformed space.

36. A scan system as in claim 1, wherein the physical parameter of the target is calculated using a scan number equation.

* * * * *